Patented Mar. 18, 1941

2,235,570

UNITED STATES PATENT OFFICE 2,235,570

PROCESS FOR THE MANUFACTURE OF 1,4,5,8 - TETRA - AMINO - ANTHRAQUINONE

Pierre Bludow, Lyon, France, assignor to Societe "Rhodiaceta," Paris, France

No Drawing. Application December 23, 1938, Serial No. 247,406. In France December 24, 1937

3 Claims. (Cl. 260—378)

The present invention relates to the preparation of 1,4,5,8-tetra-amino-anthraquinone from the corresponding 1,4,5,8-chloro compound.

The preparation of 1,4,5,8-tetra-amino-anthraquinone can be effected by treating 1,4,5,8-tetrachloranthraquinone with the help of the imides of carboxylic acids, as for example phthalimide.

The use of this process involves the creation of a small secondary manufacture as well as the principal manufacture, which increases the cost price and necessitates the use of more material.

According to the present invention it has been found that it is not necessary to introduce the imide itself into the reaction and that it is much simpler to make use of the acid ammonium phthalate or still more simply to use phthalic anhydride and a small quantity of ammonia. These additions are made to a large excess of phthalic anhydride which serves as a reaction medium. Alternatively the ammonium phthalate may be formed in situ from ammonia and phthalic acid in an excess of phthalic anhydride. The water thus introduced is eliminated by heating to 150–180° C.; the other reactants are then added and the condensation is effected with formation of tetraphthalimidoanthraquinone. This latter product is treated by a hydrolysing agent to give tetra-amino-anthraquinone.

The following examples are intended to illustrate the invention, but are not limitative.

Example 1

309 grams of phthalic anhydride and 80 grams of a solution of 16% ammonia are first of all introduced into the reaction vessel and heated to 150–180° C. until water vapour is eliminated, which may take 2 to 3 hours.

| | Grams |
|---|---|
| Tetrachloranthraquinone | 50 |
| Potassium carbonate | 50 |
| Powdered copper | 0.5 | are then added to the same vessel.

The temperature is then brought to 225–230° C. At the end of 18 hours heating the condensation is practically finished. The excess of phthalic anhydride is extracted with boiling water, and the resultant tetraphthalimidoanthraquinone is saponified with the help of 400 grams of sulphuric acid of 66° Bé., first of all at 40° C. for 12 hours and finally at 90° C. for one hour. The reaction mass is precipitated in 15 litres of water; the sulphate of tetra-amino-anthraquinone is washed and the base set free on the filter itself with the help of a dilute solution of sodium carbonate. Naturally the final product can be dried just as it is, or mixed before drying with products intended to facilitate its subsequent dispersion in the dye baths.

Example 2

131 grams of acid ammonium phthalate and 200 grams of phthalic anhydride are introduced into the reaction vat and fused by heating to 150–180° C.

| | Grams |
|---|---|
| Tetrachloranthraquinone | 50 |
| Potassium carbonate | 50 |
| Powdered copper | 0.5 | are added to this molten mixture.

The whole is heated to 225–230° C. for about 18 hours. The rest of the treatment is effected as described in Example 1.

What I claim and desire to secure by Letters Patent is:

1. A process for the preparation of 1,4,5,8-tetra-amino-anthraquinone, consisting in treating 1,4,5,8-tetrachloranthraquinone with ammonium phthalate formed in situ from ammonia and phthalic acid in an excess of phthalic anhydride as reaction medium in the presence of metallic copper and then hydrolysing the condensation product obtained.

2. A process for the preparation of 1,4,5,8-tetra-amino-anthraquinone, consisting in treating 1,4,5,8-tetrachloranthraquinone with ammonium phthalate formed in situ from a mixture of phthalic anhydride and ammonia in an excess of phthalic anhydride as reaction medium in the presence of metallic copper and then hydrolysing the condensation product obtained.

3. A process for the preparation of 1,4,5,8-tetra-amino-anthraquinone, consisting in treating 1,4,5,8-tetra-chloranthraquinone with ammonium phthalate formed in situ from ammonia and a member selected from the group consisting of phthalic acid and phthalic anhydride in an excess of phthalic anhydride as reaction medium in the presence of metallic copper and then hydrolysing the condensation product obtained.

PIERRE BLUDOW.